United States Patent [19]

Jinbo

[11] 3,781,797

[45] Dec. 25, 1973

[54] CODE PROCESSOR OUTPUT BUFFER VERIFY CHECK

[75] Inventor: William Jinbo, Skokie, Ill.

[73] Assignee: GTE Automatic Electric Laboratories Incorporated, Northlake, Ill.

[22] Filed: Jan. 2, 1973

[21] Appl. No.: 320,360

[52] U.S. Cl. .................... 340/146.1 R, 235/153 AE

[51] Int. Cl. .................... G06f 11/00, G08c 25/00

[58] Field of Search ............ 340/146.1 R, 146.1 BA, 340/146.1 BE, 146.2; 235/153 R, 153 AE, 153 AP, 153 AM

[56] References Cited

UNITED STATES PATENTS

| | | | |
|---|---|---|---|
| 3,439,343 | 4/1969 | Stahle | 235/153 AM |
| 3,544,777 | 12/1970 | Winkler | 235/153 AE |
| 3,562,708 | 2/1971 | Verbarg et al. | 235/153 A |
| 3,624,372 | 11/1971 | Philip et al. | 235/153 AE |

*Primary Examiner*—Charles E. Atkinson
*Attorney*—K. Mullerheim et al.

[57] ABSTRACT

An arrangement for verifying the content of an output buffer in a system including a first register which, during an initial memory word search, is used to compare with a second register to find a proper translation memory word. During the verify mode, the first register, via a verify bus, takes data loaded to the output buffer and compares the content with the data in the second register.

4 Claims, 4 Drawing Figures

CODE PROCESSOR OUTPUT BUFFER VERIFY CHECK

FIELD OF THE INVENTION

This invention relates to a centralized automatic message accounting system. More particularly, it relates to a code processor output buffer verify check, for use in such a system.

In the hereinafter generally disclosed centralized automatic message accounting system, a code processor performs code screening and checking by analysis of the trunk equipment identity and the called and/or the calling numbers. Various memory tables are searched to find the proper memory word. The data in these memory words is then accumulated in an output buffer register for eventual sending to a call processor. The code processor output buffer verify check arrangement provides a method to insure that the data loaded from the memory words have been correctly received and stored in the output buffer.

Accordingly, it is an object of the present invention to provide an improved centralized automatic message accounting system.

More particularly, it is an object to provide in such a system an arrangement for verifying the content of an output buffer.

A still further object is to provide such an arrangement wherein the output channel of the output buffer is exercised and checked before the complete information data is sent.

Still another object is to provide such an arrangement wherein an existing comparison register is used for a dual purpose.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

DESCRIPTION OF THE INVENTION

Figure 1:
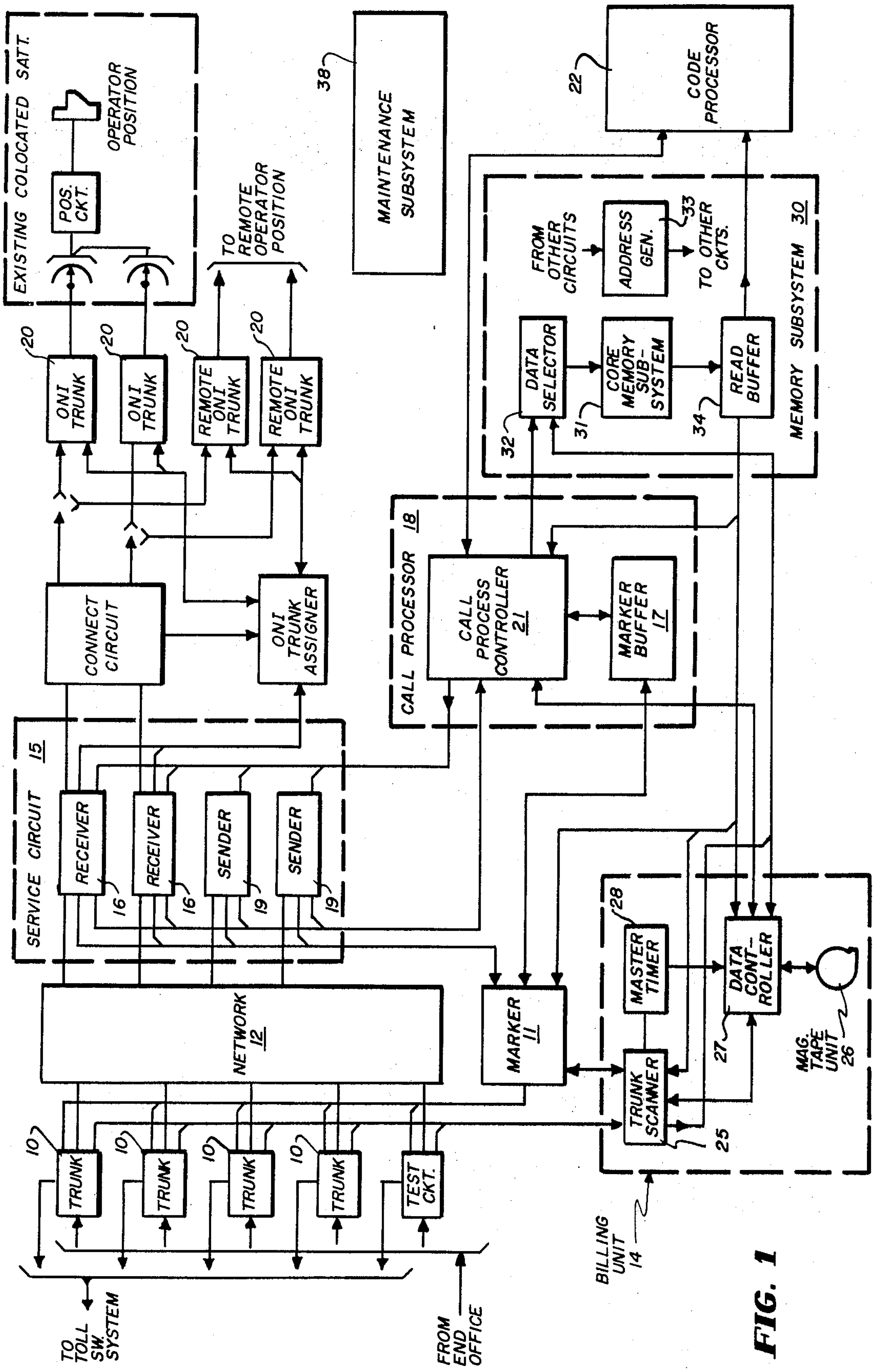
FIG. 1 is a functional block diagram of the centralized automatic message accounting system.

Referring now to the drawings, in FIG. 1 the centralized automatic message accounting system is illustrated in block diagram, and the functions of the principal equipment elements can be generally described as follows. The trunks 10, which may be either multifrequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1 percent.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has eight rows and each row consists of 50 bits of information. The first and second rows are repeated in rows 7 and 8, respectively. Each row consists of two physical memory words of 26 bits per word. Twenty-five bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a 6 or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. The trunk scanner 25 is connected to the trunks by a highway extending from the billing unit 14 to each trunk. Potentials on the highway leads will indicate states in the trunks.

Each distinct entry (initial, answer, disconnect) will contain a unique entry identity code as an aid to the electronic date processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the 9 channel billing tape. The read function will allow the tape unit to be used to update the memory.

The recorder operates in the continuous mode at a speed of 5 inches per second, and a packing density of 800 bits per inch. Billing data is recorded in a multi-entry format using a nine bit EBCDIC character (extended binary coded decimal interchange code). The memory subsystem 30 serves as the temporary storage of the call record, as the permanent storage of the code tables for the code processor 22, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office, it will provide an off-hook to the originating office and initiate a call-for-service to the marker 11. The marker 11 will check the equipment group and position scanners to identify the trunk that is requesting service. Identification will result in an assignment of a unique four digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST," the call processor controller 21 will command the receiver 16 to instruct the trunk circuit 10 to return an off-hook to the calling office, and it will request the code processor 22.

The code processor 22 utilizes the called number to check for EAS blocking and other functions. Upon completion of the analysis, the code processor 22 will send to the call processor controller 21 information to route the call to an announcement or tone trunk, at up to four prefix digits if required, or provide delete information pertinent to the called number. If the call processor controller 21 determined that the call is an ANI call, it will receive, accumulate and store the calling number in the same manner as was done with the called number. After the call process controller 21 receives "ST," it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including "KP" and "ST." The call process controller 21 will control the duration of tones and interdigital pause. After sending of "ST," the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1,370 characters. Once the billing unit memory is filled, the magnetic tape unit 26 is called and the contents of the billing unit memory is recorded onto the magnetic tape.

The final result of actions taken by the system on a valid call will be a permanent record of billing information stored on magnetic tape in multi-entry format consisting of initial, answer, and disconnect or forced disconnect entries.

As indicated above, the present invention is particularly concerned with the code processor 22, the main purpose of which is to analyze called destination codes to perform screening, prefixing, and code conversion operations which are originating point dependent. In general this code processing is peculiar to the needs of DDD originating traffic and is not concerned with trunk selection and alternate routing, which are regular translation functions of the associated toll switching machine. Originating point determination is made on two bases: (1) trunk group class (Class Mark), usually defining a specific tributary office; and (2) originating code analysis, an option controlled by the trunk group class. The latter permits a number of different classes such as WATS with various zone capabilities to be served, along with regular DDD, on a combined trunk group from each end office.

The code processor 22 is accessed only by the call processor 18 on a demand basis. The input and output thereof consists of registers for temporary storage of information until it is required. The code processor 22 also contains provisions for: EAS blocking; pretranslation of dial pulse (D.P.) calls after three received digits to determine length of called code; IN-WATS zoning and code conversion; OUT-WATS screening for out-of-zone calls. These specified functions generally are accomplished by comparing input information with table entries in the core memory subsystem 31, selecting a "routing" entry from the memory subsystem, and placing that information into an output buffer.

Figure 2:
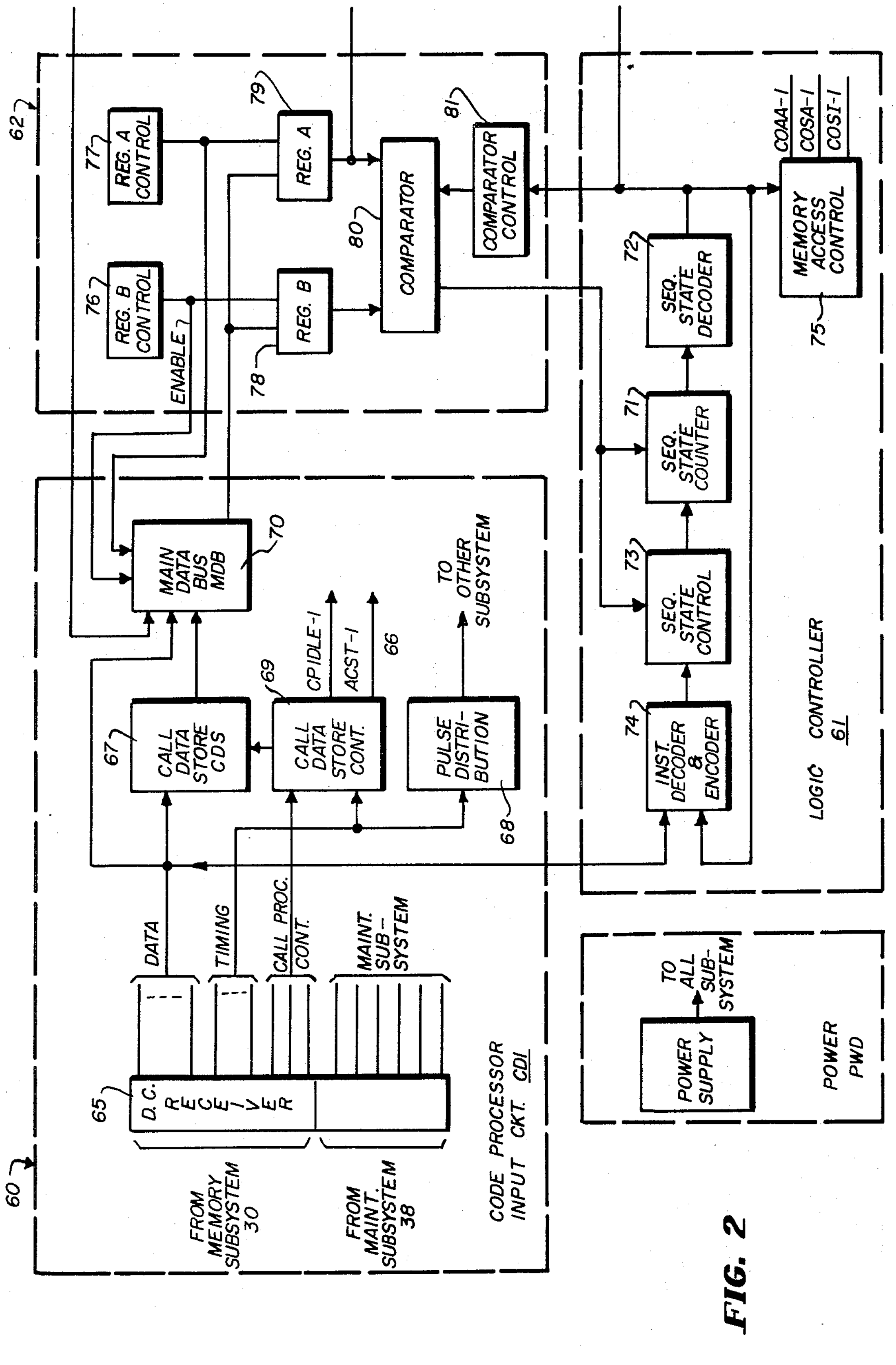
FIGS. 2 and 3 are a functional block diagram of the code processor within said system.
Figure 3:
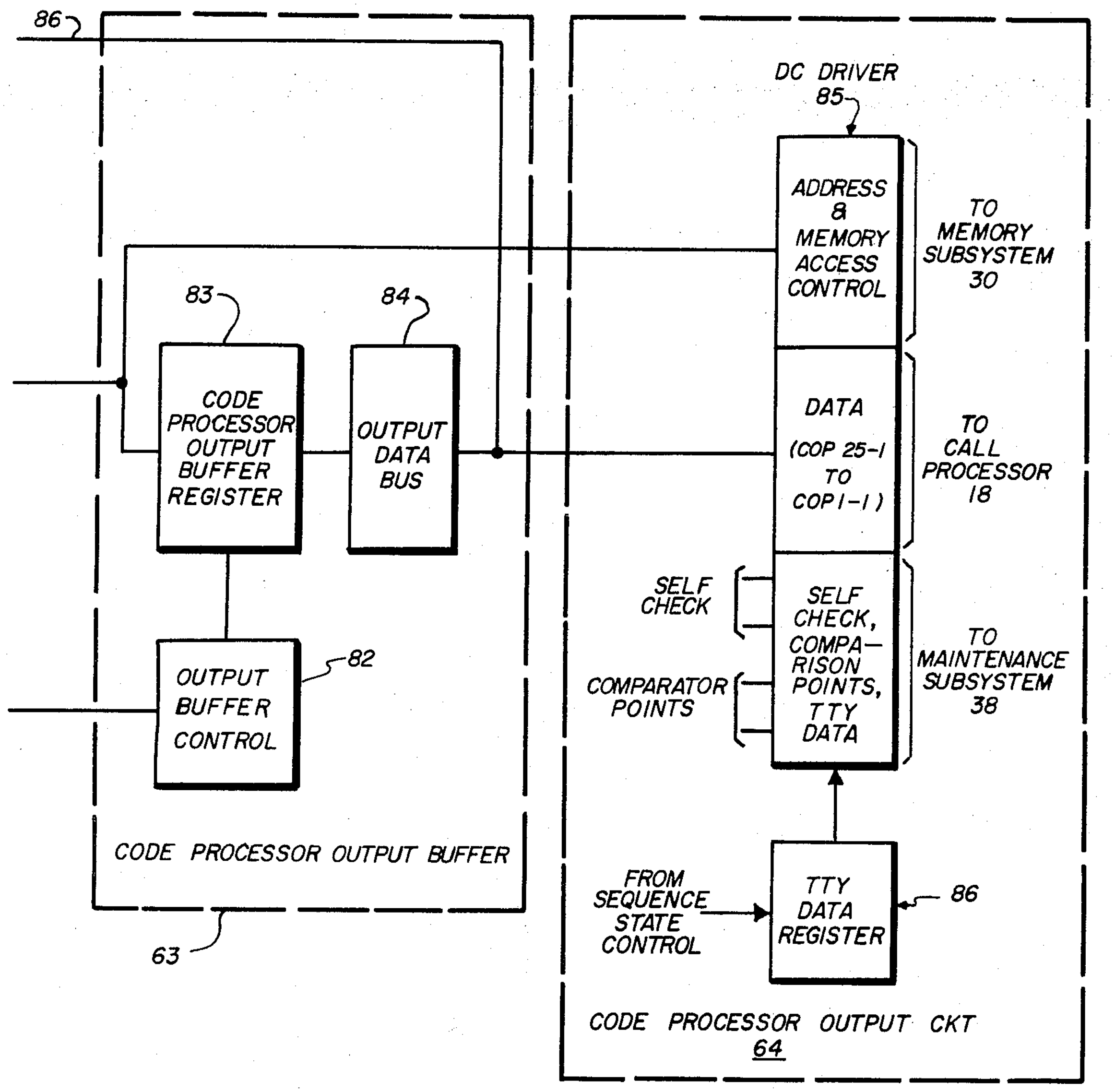

The code processor 22 is shown in block diagram schematic in FIGS. 2 and 3, and is comprised of logic circuitry, and data tables contained in the core storage of the core memory substystem 31 of the memory subsystem 30 (FIG. 1). The logic circuitry has five main functional subsystems: a code processor input circuit 60 for receiving and storing call data; a logic controller 61 for sequencing and controlling all logic functions; a comparison circuit 62 for comparing call data with memory tables; an output buffer 63 for storing data for the call processor 18; and an output circuit 64 for sending information to the call processor 18 and to the other subsystems as required. Integrated into these logic functions are self check alarms to verify proper operation. These functional subsystems and their operations are more particularly described below.

Code Processor Input Circuit 60

The code processor input circuit 60 includes a D.C. receiver 65 which is the input interface from the call processor 18, the memory subsystem 30, and the maintenance subsystem 38. Input data and control signals are received by the D.C. receiver 65, and are distributed throughout the code processor's logic. The main function of the D.C. receiver is to receive call store data and translation table words from the memory subsystem 30. Both types of data are received on the same 26 leads from the memory subsystem 30, with the specific type of data controlled by a signal from the code processor 22.

After receiving a request for service from the call processor 18, the code processor 22 marks a control lead 66 to the memory subsystem 30 initiating the call store data transfer. In this mode, the memory subsystem sends a row of call store information (50 bits + parity) as 2–26 bit memory words. Selected bits from these words are stored in the call data store 67, and after storing the call store information, the code processor removes the mark on the lead 66 which places the memory subsystem in a mode to send translation table words.

Whenever memory words are presented to the code processor 22, a parity check circuit will check for proper parity. A parity failure will result in a self check alarm being sent to the maintenance subsystem.

The pulse distributor 68 distributes the necessary timing pulses to the other functional subsystems in the code processor 22.

The call data store 67 is an 88 bit register which is only active during the call store transfer mode as described above. The specific bits are directed into the proper storage by commands generated by the call data store control 69. If the latter fails to generate any of the necessary commands, a code processor input data self check alarm results.

The words "stored in the call data store" may be used one at a time by gating the appropriate bits onto the main data bus 70.

The main data bus 70 is the communication channel between the input circuit 60 and the comparison circuit 62. Three types of inputs are organized and gated via the main data bus 70:

1. Data from the call data store 67 is gated onto the main data bus 70 for the B register 78 of the comparison circuit 62 during one timing interval, or for the A register 79 during another timing interval.
2. Translation table memory words are gated onto the main data bus 70 for the A register 79 during the same timing interval indicated above.
3. Data from the output buffer 63 is gated on the main data bus 70 for the B register 78 during the above indicated timing interval.

Logic Controller 61

The sequence state counter 71 and the sequence state decoder 72 of the logic controller 61 control the various wired sequence states in the code processor 18. The sequence state counter 71 is a 2 out of 5 (2/5) counter which advances when a comparison is found by the comparator 80 of the comparison circuit 62. The next sequence state is then decoded by the decoder 72 to control the logic for the next operation. If the decoder 72 detects a 2/5 code failure, a self-check alarm will result. To enhance the flexibility of a wired logic system, the counter 71 advances by even numbered sequence states. If additional logic functions become necessary, the odd numbered sequence states and spare sequence states are available For unused odd numbered sequence states, the decoder 72 will detect such a state as a self check alarm.

The sequence state control 73 permits changing the sequence state as a function of other decoded states. After receiving the call store information, the sequence state control 73 examines the translation instruction (TI) digit to force the counter 71 into one of five wired logic sequences. After the counter 71 assumes this sequence state, the sequence state control 73 monitors for any possible sequence state changes.

The instruction decoder and encoder 74 examines the 4 bit identification code in each memory word and decodes this character into a 1 out of 6 code to the sequence state control 73. If the code requires a change in the sequence state, as in the case of, for example, a 6D directive code, the sequence state control 73 will cause the change in the sequence state.

The instruction decoder and encoder 74 generates identification codes, in 2/5 code, as a function of the decoded sequence state. If a particular identification code is necessary, this code is generated, placed on the main data bus 70 for the B register 78, and used for comparison with the memory words. If a code is generated which is not in 2/5, the B register 79 parity check circuit will indicate a self check alarm.

The memory access control 75 contains logic to generate specific memory control signals for given sequence states. The control signals are provided in various legitimate combinations, and any other combination will result in a memory access control self check alarm.

The A register 79 is a 25 bit register used for temporary storage of translation memory words. The memory words are gated onto the main data bus 70 during a preestablished timing interval and in this interval the register A control 77 clears and loads the A register 79 with the new memory word. A parity check circuit then verifies for proper parity of this register and the memory generated parity bit. An incorrect parity check will result in the A register self check alarm.

The output of the A register 79 is used to compare with the contents of the B register 78 via the comparator 80. When a comparison is found, the A register 79 contains the proper translation word. This word will be either a memory address or data for the output buffer 63. When the A register contains an address, the organization of the translation words are such that the address always appears in bits 12 thru 25. These bits from the A register 79 are presented to the memory along with the proper control signal from the memory access control 75 to read the new memory word on the next memory access cycle. When the A register 79 contains data for the output buffer 63, the output buffer control 82 gates selected bits of the A register 79 into the proper storage location in the output buffer register 83 during an established timing interval.

The B register 78 is a 25 bit shift register used to temporarily store 2/5 data from the call data store 67 or the output buffer 63 for comparison with the A register 79. During an established timing interval, the register B control 76 places the data on the main data bus 70, clears and loads the B register 78 with the new data, and sets a B register parity bit. A parity check circuit then checks the parity bit with the 2/5 data in the B register 78. A load command failure or a B register data failure will result in a self check alarm.

The B register 78 is used to find the proper translation memory word by comparing its contents with the A register 79. When the proper word is found and selected bits are loaded from the A register 79 to the output buffer register 83, the B register 78 is then used to verify the contents of the output buffer register 83. The data just placed in the output buffer register 83 is sent, via a verify bus 86, onto the main data bus 70 and loaded into the B register 78 during an established timing interval. The B register 78 is then compared with the data bits of the A register 79. A non-comparison will result in a verify self check alarm indicating improper data transfer to the output buffer 63.

The B register 78 will be used as a shift register when comparing the double packed translation table class mark words. In this compare sequence, the class mark placed in the B register 78 is compared with the first class mark in the A register 79, then shifted and compared with the second class mark. If a comparison is detected, the compare sequence stops. Otherwise, this sequence is repeated for the next class mark word.

The comparator 80 takes the outputs the B register 78 and the A register 79 and compares for a match on selected bits as specified by the comparator control 81. All bits not selected for comparison are forced to a match state. If the comparator 80 detects a match, a signal is generated to the sequence state counter 71 to advance the sequence state. If the comparator 80 detects a non-comparison, the memory access control 75 presents a signal to read the next memory word. The comparison sequence is then repeated for the new memory word.

The comparator 80 also has the capability of recognizing a force coincidence code in the memory data. The force coincidence is only and always possible when comparing 2/5 data. The force coincidence code used is 11111.

Output Buffer 63

The output buffer register 83 of the output buffer 63 is a 63 bit storage register used to store translation data for the call processor 18. Data to this register 83 normally enters from the A register 79 and is directed into the proper storage location by the output buffer control 82. When the code processor 22 finishes the translation, a translation available lead is marked to the call processor 18 and the translation data is then continuously gated in until the call processor 18 indicates that transfer has been completed. The transfer completed mark from the call processor 18 then resets the output buffer 63 and also places the code processor 22 in the "IDLE" state awaiting the next request for service.

The output buffer control 82 directs data from the A register 79 into the specific storage elements in the output buffer register 83. This control 82 also has the additional function to generate a sequence number as part of the translation data.

The sequence number is a 2/5 digit generated by examining the resulting translation data. This number instructs the call processor 18 on the action which must be taken with this call. Sequence number generation occurs at the end of a translation sequence but before marking the translation available lead.

The output data bus 84 functions to organize information to the call processor 18 and also to provide a data channel between the output buffer 63 and the main data bus 70. When the code processor 22 makes the translation data available, the output data bus 84 organizes the data in the output buffer register 83 into five 26 bit words for the call processor 18. The data words are gated by row word pulses in such a format to allow ease when transferring this data to the call store. When specific bits in the data words contain no translation data, these bits will be presented as all zeroes.

Code Processor Output 64

The code processor output 64 includes a D.C. driver 85 which is the output interface between the code processor 22 and the other subsystems. The code processor 22 sends address and control information to the memory subsystem 30, translation data to the call processor 18, and self check and comparison points to the maintenance subsystem.

The TTY data register 86 is used to store the code processor's sequence state for a teletype printout. A maintenance controller of the maintenance subsystem monitors both the on-line and off-line code processor for any discrepancy in selected comparison points. Since both code processors should run in synchronism, any discrepancy indicates a trouble in one of the subsystems. As an aid in localizing the problem, the detection of a code processor maintenance non-comparison forces the associated TTY data register to store the present sequence state. The sequence states are then printed as part of the diagnostic printout. After the system routiner has determined the faulty logic, analysis of the sequence state printout will indicate the effected logic area and therefore which logic cards to change.

Verify Check Feature

As described above, the B register 79 is used to find the proper translation memory word by comparing its contents with the A register 79. When the proper word is found and selected bits are loaded from the A register 79 to the output buffer register 83, the B register is then used to verify the contents of the output buffer 63. The data just placed in the output buffer register 83 is sent, via the verify bus 86, onto the main data bus 70 and loaded into the B register 78. The B register 78 is then compared with the data bits of the A register 79. A non-comparison will result in a verify self check alarm indicating improper data transfer to the output buffer 63.

Figure 4:
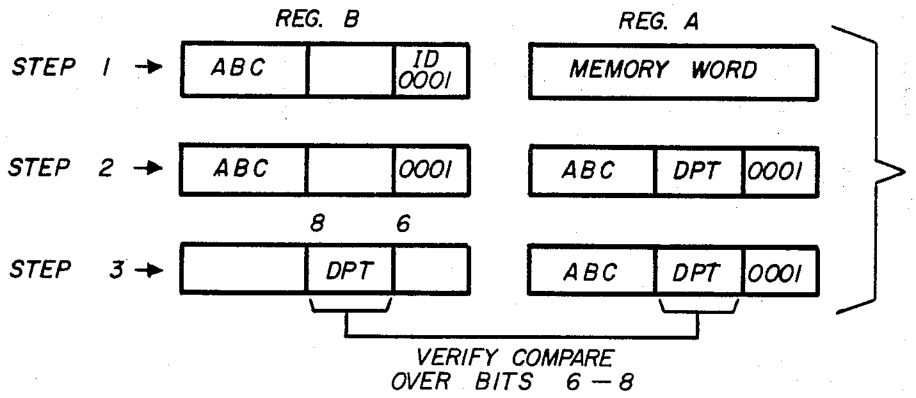
FIG. 4 illustrates an example of the verify check feature.

The diagrams of FIG. 4 generally illustrate this verify check feature. As an example, these diagrams illustrate a memory search for the dial pulse pre-translation bits (DPT). In step 1, the first three digits of the called number (ABC) along with an identifier code ID0001 are placed from the call data store 67 into the B register via the main data bus 70, in the manner described above. A memory word is then read and placed into the A register 79 and compared with the B register 78 to find a memory word with the same (ABC) code. The memory word is found in step 2, and contains the associated DPT bits. The DPT bits are then placed from the A register 79 into the output buffer register 83. Once the DPT bits are stored, the content in the output buffer register 83 is sent, via the verify bus 86, to the main data bus 70 and into the B register 78.

Step 3 indicates that the previous content of the B register 78 has been cleared and replaced by the DPT bits in bit positions 6–8. The content of the A register 79 remains the same. The comparator 80 takes the outputs of the B and A registers and compares for a match on the selected bits as sepcified by the comparator control 81. All bits not selected for comparison are forced to a match state. If the comparator 80 detects a match, a signal is generated to the sequence state counter to advance the sequence state. A noncomparison will result in a verify self check alarm indicating improper data transfer to the output buffer 63.

This verify check sequence can be compared to doing an exclusive OR of the input and output of a register to verify that the data present at the input has been stored correctly to the output. The difference is that the verify circuit uses an existing comparison B register for a dual purpose. In the initial memory word search, the B register 78 is used to compare with the A register 79 to find the proper memory word. In the verify mode, the B register 78, via the verify bus 86, takes data loaded to the output buffer 63 and compares, or verifies, the content with the data in the A register 79.

The verify sequence has the additional advantage in that the output data bus 84 is exercised and checked prior to sending completed translation data to the call processor 18.

This verify method can be applied in almost all cases where data verification is necessary when loading to an output register. It is particularly useful when data is being accumulated in a large output buffer by means of a multiple load such as in the code processor 22.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

1. In a communication system wherein a first register is used to find a proper memory word by comparing its contents with a second register, and when the proper memory word is found and is loaded from said second register to an output buffer, a method for verifying the content of said output buffer comprising the steps of:

a. coupling the content of said output buffer into said first register and storing the same therein; and b. comparing the content of said first register with the content of said second register for a match.

2. In the communication system of claim 1, wherein selected bits of the proper memory word are loaded from said second register to said output buffer, said method further including the steps of:

a. clearing said first register;

b. coupling the selected bits in said output buffer into said first register and storing the same therein; and c. comparing said selected bits in said first register with the selected bits in said second register for a match.

3. In a communication system including a call data store for receiving and storing information data and a memory for storing a plurality of translation memory words, certain ones of said translation memory words being associated with and providing a proper translation memory word for said information data, an arrangement comprising a first register into which said information data from said call data store is temporarily stored; a second register into which memory words from said memory are temporarily stored; comparator means for comparing a memory word read from said memory and stored in said second register with said information data read from said call data store and stored in said first register, an output buffer into which said translation memory word is stored when a comparison between a translation memory word and said information data is found; a verify bus for coupling said translation memory word coupled to and stored in said output buffer into said first register for comparison by said comparator means with said translation memory word stored in said second register, to thereby verify the received and stored content of said output buffer.

4. In a communication system including a call data store for receiving and storing information data, a memory for storing a plurality of translation memory words, certain ones of said translation memory words being associated with and providing a proper translation memory word for said information data, comparator means for comparing said translation words with said information data during an initial memory word search to locate the proper translation word, and an output buffer into which the translation word is stored when a comparison between a translation memory word and the information data is found, an arrangement comprising a first register into which said memory words are read during said initial memory word search for the proper translation memory word, and a second register for providing the dual function of storing said information data used to compare with said memory words stored in said first register and for taking and storing data loaded into said output buffer from said first register for comparison with the content of said first register to verify the received and stored content of said output buffer.

* * * * *